June 21, 1932.  E. D. MOORE  1,864,026
TROLLEY HEAD
Filed Jan. 12, 1931   2 Sheets-Sheet 1

Inventor
EDGAR D. MOORE
By
Attorney

WITNESS:
V. P. Sparks

June 21, 1932.  E. D. MOORE  1,864,026
TROLLEY HEAD
Filed Jan. 12, 1931    2 Sheets-Sheet 2

WITNESS:
V. P. Sparks

Inventor
EDGAR D. MOORE
By
Attorney

Patented June 21, 1932

1,864,026

UNITED STATES PATENT OFFICE

EDGAR D. MOORE, OF MANSFIELD, OHIO, ASSIGNOR TO THE OHIO BRASS COMPANY, OF MANSFIELD, OHIO, A CORPORATION OF NEW JERSEY

TROLLEY HEAD

Application filed January 12, 1931. Serial No. 508,025.

My invention relates to trolley heads or current collectors and has special adaptation to the collecting of currents by means of a sliding shoe mounted upon trolley busses.

One of the objects of my invention is to provide a device in which the motions or various movements between the shoe and its support shall be centered or concentrated upon contact surfaces between the support and shoe at one locality in place of various and distant surfaces of contact.

In the operation of trolley busses which do not follow a definite or fixed path relative to the trolley wires overhead, but are free to swing laterally to either side of the trolley wire, it is necessary to have a collector shoe in contact with the trolley wire which will respond quickly and freely to the movements of the bus and/or pole relative to the trolley wire.

This requires a trolley head in which the shoe moves upon its support very freely in those directions necessary and the head should be as light as possible with the necessary strength of its various parts. The head should be simple and compact and free from the possibility of the device catching in the overhead system especially when the bus is moving in its normal or forward direction. The contact of the shoe with the support should be as efficient as possible so as to reduce heating, loss of energy, pitting of the contact surfaces, etc. due to the current flowing from the shoe to the support.

My invention resides in the new and novel construction, combination and relation of the various parts herein described and shown in the accompanying drawings.

In the drawings:—

Figure 1:
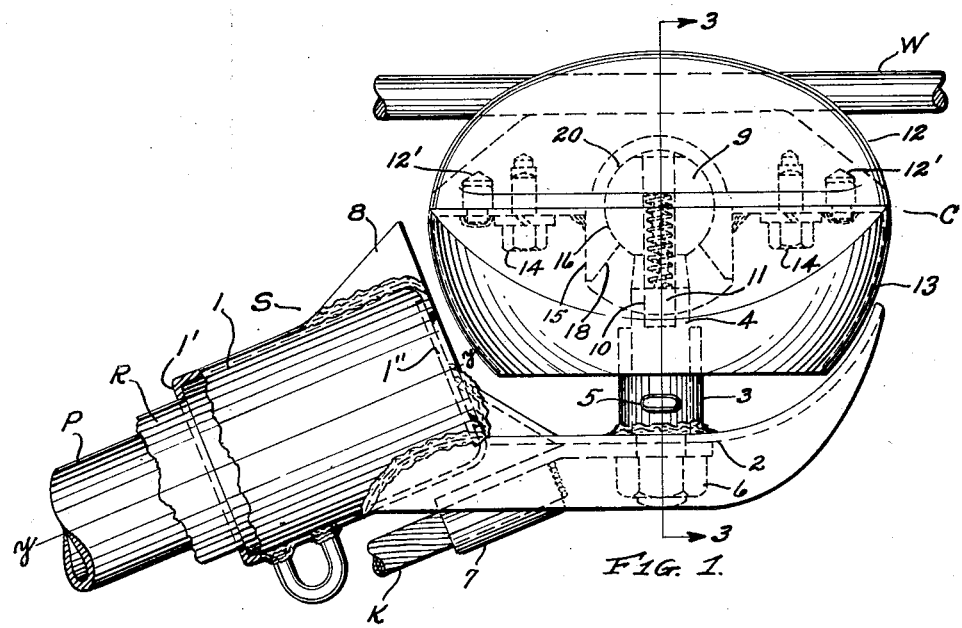
Fig. 1 is a side view of my invention mounted upon a trolley pole.

In the preferred embodiment of my invention I employ a support S and the collecting device C mounted upon the support S. The support S is mounted on the trolley pole P with an interposed resilient cushion R composed preferably of rubber.

The support S comprises a socket member 1 to receive the cushion R and held in place by means of the turned in edge or flange 1'. The outer end of the socket 1 is closed and reinforced by the part 1'' welded to the part 1. Projecting from the socket 1 is a base 2 which may be formed of channel or of other shape and which is welded to the socket 1 as indicated on the drawings and has its free end extending upwardly to form a guard. Mounted upon the base 2 is a collar 3 welded to the base 2. Mounted in a passage in the collar and base and projecting upwardly is a stud 4 held in fixed relation to the collar 3 by means of the spring cottar 5 and the nut 6.

Between the nut 6 and the base 2 I secure a connector 7 to receive a cable K for conducting current away from the trolley head. A guard 8 is mounted on the socket 1 and welded thereto as a means of safety should the device leave the trolley wire while the bus is under motion.

The stud 4 is provided at its upper end with an integrally formed ball or ball shaped member 9 and the ball and stem portion are provided with an axially disposed cavity 10 to receive the connector or shunt 11. As stated, the collector C is mounted upon the stud 4 and comprises the shoe 12 and the retaining portion 13 held together by means of the screws 14. The retainer 13 is of an inverted receptacle formation and has mounted within its interior a member 15 which is welded to the retainer portion as indicated in the drawings and is provided with a socket or recess having a hemispherical surface 16 or a spherical surface less than a hemisphere to receive the lower half of the ball 9 and also has an opening 17 with spaced walls 18 which will permit the collector to have a limited movement in a plane common to the axis X—X of the stud 4 and the longitudinal center line of the groove 19 of the shoe 12. This plane will be substantially longitudinally vertical with respect to the groove and axis X—X at all times and will hereinafter be referred to as a longitudinal vertical plane. The relative movement of the collector C with respect to the stud 4 in said longitudinal vertical plane is limited by the faces 18 engaging with the stud 4.

Figure 6:
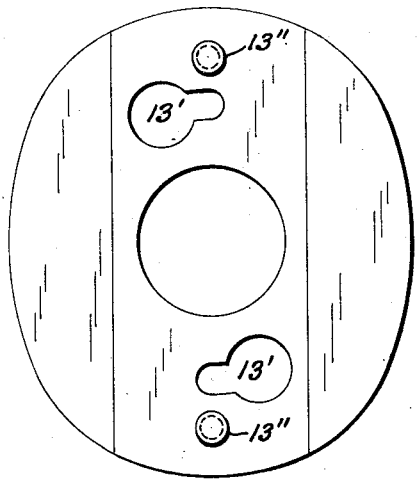
Fig. 6 is a top plan view of a part of my invention later described.
Figure 2:
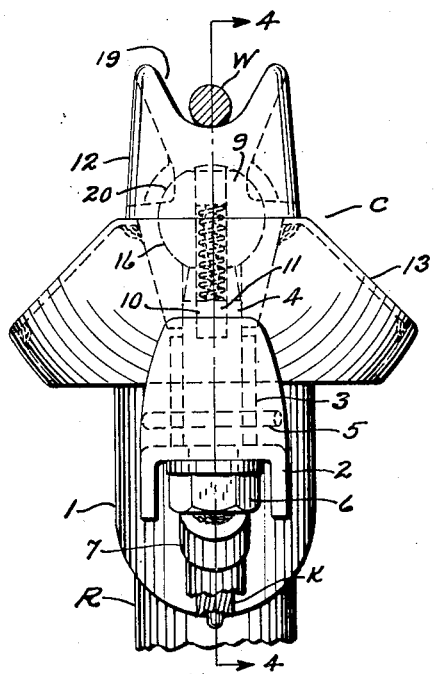
Fig. 2 is a rear end view of my device shown in Fig. 1.
Figure 3:
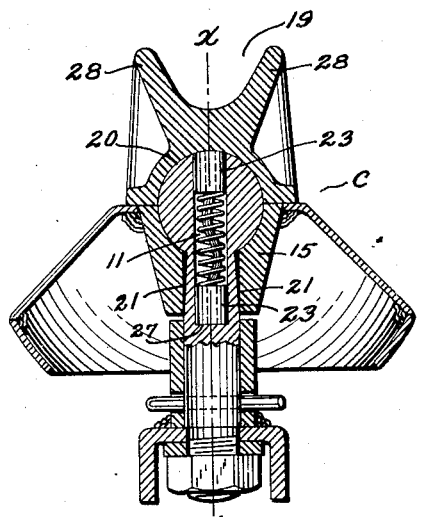
Fig. 3 is a sectional view of Fig. 1 on the line 3—3.
Figure 4:
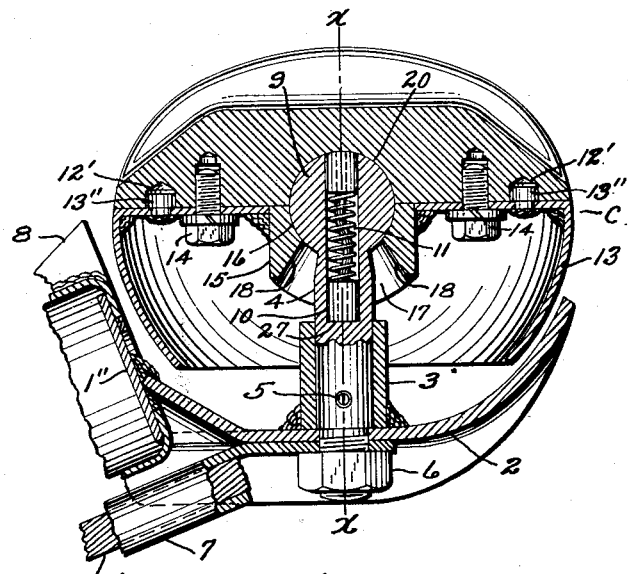
Fig. 4 is a sectional view of a portion of my device taken on the line 4—4 of Fig. 2.
Figure 5:
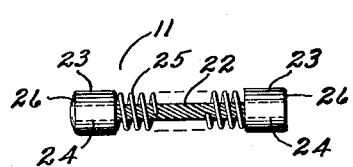
Fig. 5 shows in detail the connector which I employ to increase the efficiency of contact between the shoe and its support.

In order to facilitate the application of the shoe to the retainer 13, the screws 14 are secured part way in the shoe and then inserted through the bayonet slots 13' in the upper side of the saddle (Fig. 6) and then rotated slightly to bring into alinement so that the dowels 13" will register with holes 12' in the shoe and then the screws 14 are drawn up tightly. The dowels 13" are welded in place. The dowels help hold the parts against relative movement.

The shoe 12 is also provided with a recess having a spherical or hemispherical surface 20 to receive the upper portion of the ball 9. The slot 17 in the member 15 has spaced side walls 21 sufficiently spaced to receive the stud 4 and which prevent relative movement of the collector and stud 4 in a plane common to the axis X—X and transverse to the groove 19 and its longitudinal center line and which at all times under normal operating conditions is substantially vertical and which I shall hereinafter refer to as the transverse vertical plane.

The said vertical planes it will be recognized are at right angles to each other.

There is no limit to the rotation of the collector C upon the stud 4 in the plane transverse and at right angles to the axis X—X and which I will hereinafter refer to as the horizontal plane. The stud 4 is so positioned relative to the axis Y—Y of the pole P that its axis X—X will be substantially vertical under normal line construction, that is, the majority length of the trolley wire W will be substantially the same or at a uniform distance above the roadway and the angle of the axis X—X with respect to the axis Y—Y will be such that the axis X—X will be substantially at right angles to the axis of the trolley wire W under such said normal construction, but at railroad crossings where the trolley is considerably raised or where it passes under viaducts and is lowered the axis X—X may be considerably off from the vertical. Proper operation is not interfered with should the axis X—X be other than vertical.

The axis X—X passes through the center of the groove 19 both transversely and longitudinally, but this may be varied if desired to secure various results of operation.

The shoe 12 may be of copper, copper base alloy, steel or iron and the groove 19 is positioned between the flanges 28 and may be of various shapes to meet requirements. The support S is made of various parts and these parts are formed up preferably from ferrous sheets, tubes, rods, bars, forgings, etc., and which may be termed structural material as distinct from cast material and these parts are united and held in proper relation by welding such as the arc or oxy-acetylene welding or brazing, these methods requiring no description as they are known to those skilled in the art.

The retainer 13 is shown as being formed of two pieces of sheet metal welded together and having welded thereto the socket member 15 which may be drop forged or cut out of solid bar or block material.

The present overhead devices are made from castings and the sections are heavy and their weight is quite large, especially as compared with my device and this is a marked detriment as the poles used in trolley bus operation are longer by several feet than the poles used on ordinary trolley car and, therefore, weight is a considerable factor and must be carefully dealt with and it is found that the lower the weight, the less is the tendency for the trolley shoe to leave the wire.

As the socket or recess to receive the ball 9 may be less than a hemisphere, I have referred to the same as a recess or socket having a spherical surface.

The collector C and stud 4 may be mounted upon other forms of support than a pole if desired, as for instance upon a pantograph frame.

There will, of course, be variations which will suggest themselves to those skilled in the art after reading my disclosure, therefore, I wish to be limited only by my claims.

I claim:—

1. A trolley head having a ball mounted thereon and means to secure the head to a trolley pole, a shoe provided with an elongated contact groove and pivotally mounted on the ball in direct surface contact therewith with the vertical center line of the ball substantially intersecting the longitudinal center line of the groove, means attached to the shoe by a bayonet joint as described to secure the shoe in position on the ball, the shoe to pivot in a vertical plane coinciding with the longitudinal center line of the groove.

2. A trolley head having a ball and a support therefor mounted on the head and means to seccure the head to a trolley pole, a shoe provided with an elongated contact groove and pivotally mounted on the ball with the vertical center line of the ball substantially intersecting the longitudinal center line of the groove, means to secure the shoe on the ball and having an elongated opening through which the support passes, the sides of the slot cooperating with the support to permit the shoe to pivot in a horizontal plane but not in a plane transverse to the contact groove.

3. A trolley head having a ball mounted thereon and means to secure the head to a trolley pole, a shoe provided with an elongated contact groove and a recess with a spherical surface pivotally mounted directly in contact with the ball with the vertical center line of the ball substantially intersecting the longitudinal center line of the groove, means secured to the shoe to secure the shoe to the ball and permit the shoe to pivot in a vertical plane coinciding with the longitudinal center line of the groove and simultaneously in a horizontal plane and prevent the shoe pivoting in a vertical plane transverse to the contact groove.

4. A trolley head comprising a support having means to secure it to a pole and a ball mounted on the support, an elongated grooved contact member pivotally mounted on the ball in direct contact therewith to pivot in a vertical and in a horizontal plane and means to limit its movement in the vertical plane and prevent its movement in any vertical plane transversely disposed to the grooved contact member.

5. A support for a current collector comprising a ball, projecting means secured to the ball to secure the ball to a trolley pole, a current collector provided with a contact groove detachably mounted on the ball to pivot thereon and relative thereto in a vertical plane common to the vertical axis of the ball and the longitudinal center line of the groove and a holding member detachably and pivotally mounted on the ball and detachably secured to the collector.

6. A trolley head comprising a ball, supporting means to secure the ball to a support, a shoe pivotally mounted on the ball and having contacting surfaces and a shunt conductor slidably engaging the contact surface on one part and in contact with a surface on the supporting means.

7. A trolley head comprising a ball, supporting means for the ball to attach it to a support, a grooved shoe pivotally mounted on the ball and having a surface contacting with the surface on the ball, a recess in the ball and supporting means and a shunt conductor mounted therein and engaging the contact surface on the shoe and a surface on the supporting means.

8. A trolley head comprising a ball, supporting means for the ball to attach it to a support, a grooved shoe pivotally mounted on the ball and having a surface contacting with the surface on the ball, a recess in the ball and an adjustable shunt conductor mounted therein and slidably engaging the contact surface on the shoe and a surface on the supporting means, under pressure.

9. A current collecting device comprising a support, a grooved shoe mounted on the support by a universal joint, surfaces on the shoe and support engaging and movable relative to each other to conduct current from the shoe to the support and permit relative movement of the shoe and support and an auxiliary conductor mounted within the support and contacting therewith and with the said engaging surface on the shoe and means to yieldingly maintain said contact.

10. A current collecting device comprising a support, a grooved shoe mounted on the support by a universal joint, surfaces on the shoe and support engaging and movable relative to each other to conduct current from the shoe to the support and permit relative movement of the shoe and support and an auxiliary conductor mounted within the support and contacting therewith and with the said engaging surface on the shoe, the auxiliary conductor comprising a flexible cable having contact members secured to the ends thereof and a spring between the contact members tending to increase their distance apart and maintain the contact members in engagement with the said engaging surface on the shoe and with the support.

11. A current collecting device comprising a shoe with a groove to engage a trolley wire, a support for the shoe and having relative movement therewith and a contact device concealed within one of said parts and electrically connecting the parts and having a sliding surface engagement with one part.

12. A trolley head comprising a support having a socket to receive a supporting device and a projecting stud detachably mounted on the support and having an axis substantially vertical and an enlargement on one end of the stud, a grooved shoe detachably mounted on the enlargement and pivotal relative thereto, a holding member detachably and pivotally mounted on the said enlargement and detachably secured to the shoe, the shoe being rotatable relative to the stud in a plane at right angles to the axis of the stud and pivotal in a plane common to the said stud axis and the longitudinal center line of the groove and means to prevent pivotal movement of the shoe relative to the support in a plane common with the axis of the stud and transverse to the longitudinal center line of the groove.

13. A current collector shoe comprising a metallic body having a longitudinally disposed groove on one face to receive a conductor and a socket having a spherical surface in the opposite side to receive a ball support on the end of a stem and a retaining member secured to the body and having an elongated slot through which the stem projects for the purpose described.

14. A current collector shoe comprising a metallic body having a longitudinally disposed groove on one side to receive a conductor in slidable relation thereto and a socket having a spherical surface in the opposite side to receive a ball ended support, the socket being symmetrically positioned in a transverse direction relative to the longitudinal center line of the groove and a retaining member secured to the body and engageable with the support and permit the body to pivot in all directions relative to the support except transversely to the groove.

15. A current collector shoe comprising a body having a longitudinal groove in one side and a socket in the opposite side to receive a support, means on the said opposite side of the shoe to secure a retaining member thereto.

16. A current collector shoe comprising a body having a longitudinal groove in one side and a socket in the opposite side to receive a support and move relative thereto and means secured to the shoe to detachably secure the shoe to a support and having means to cooperate with the support to prevent said movement in a substantially vertical plane transverse to the groove.

17. A connector comprising a flexible cable, terminal members having a longitudinal passage therein to receive the cable ends and fixedly secured to the ends of the cable and each terminal having an exposed contact face and a spring enclosing the cable and engaging the opposite inner faces of the terminals to yieldably extend and maintain the cable extended to a predetermined separation of the terminal members.

18. A supporting device for a trolley shoe comprising a socket to receive a support for the head, a separately formed member secured to the socket and projecting therefrom, a passage in the said member having its axis obliquely disposed to that of the socket, a separately and detachably formed member mounted in the passage against movement relative to the first said member and having a ball support thereon.

19. A current collector comprising a contact member to engage and slide along a conductor and a supporting device for the contact member to support the contact member in movable relation to the supporting device, the supporting device comprising a plurality of parts separately formed from structural metal, deposited welding metal fused to the juxtaposed surfaces and edges of the parts, one part having means to secure the supporting device to a trolley pole and other means projecting from the said part and having an enlarged end with a surface of extended area to receive the contact member thereon in direct surface engagement.

20. A unitary built-up support for a current collector comprising a socket member of drawn metal tubing, a projecting support member of rolled metal secured thereto and a socket formed of structural metal secured to the projecting support to receive a support member for the current collector.

21. A current collector shoe comprising a body having a longitudinal groove in one side, a support projecting from the other side and having its axis in a plane common to the longitudinal center line of the groove, means to hold the support in assembled and movable relation to the shoe and means depending from the shoe to enclose the sides of the support and the holding-means.

22. A current collector comprising a shoe having a groove thereon and a cavity having a spherical surface a holding member formed of sheet steel, means to detachably secure the shoe and member together, means welded to the holding member and having a cavity therein with a spherical surface registering with the cavity in the shoe to form a spherical enclosure for a universal mounting.

23. A trolley head comprising a support having a socket to receive a supporting device and a projecting stud secured to the support and having an axis substantially vertical and a spherical enlargement on one end of the stud, a grooved current collector shoe detachably and movably mounted on the said enlargement, a holding member detachably and movably mounted on the enlargement and secured to the shoe, the shoe being rotatable relative to the stud in a plane pierced by the said axis and pivotal in a plane common to the said axis and the longitudinal center line of the groove and means to prevent pivotal movement of the shoe relative to the support in a plane common to the said axis and transverse to the longitudinal center line of the groove.

24. A trolley head comprising a support having a socket to receive a supporting device and a projecting stud secured to the support and having an axis substantially vertical and a spherical enlargement on one end of the stud, a resilient cushion mounted in the socket and projecting therefrom and means on the socket to prevent accidental separation of the cushion and support, a current collector shoe having an elongated surface to contact with a conductor movably mounted on the said enlargement, a holding member movably mounted on the enlargement and secured to the shoe, the shoe being rotatable on the enlargement relative to the stud in a plane pierced by the said axis and pivotal in a plane common to the said axis and the longitudinal center line of the contact surface on the shoe and means to prevent pivotal movement of the shoe relative to the support in a plane common to the said axis and transverse to the said longitudinal center line.

25. A trolley head comprising a support having a socket to receive a supporting device and a projecting stud secured to the support and having an axis substantially vertical and a ball-shaped enlargement on one end of the stud, a resilient rubber cushion mounted in the socket and projecting therefrom and means on the socket to engage the cushion to prevent accidental separation of the cushion and support, a collector shoe having a groove with an elongated contact surface movably mounted on the enlargement and provided with means to move with the shoe and prevent accidental removal of the shoe, the shoe being rotatable on the enlargement relative to the stud in a plane pierced by the said axis and means to prevent pivotal movement of the shoe relative to the stud in a plane common to the said axis and transverse to the longitudinal axis of the groove.

26. A trolley device comprising a trolley head and a tubular support, a resilient rubber sleeve interposed between the head and the support, the head comprising a socket to receive the sleeve, means on the socket to prevent accidental removal of the head from the sleeve, the head also having a stud with a ball at one end, a grooved collector shoe with an elongated surface detachably and movably mounted on the ball, means secured to the shoe and movable therewith to prevent displacement of the shoe but permit the shoe to rotate about the axis of the stud in a plane pierced by the said axis and in a substantially vertical plane common to the longitudinal center line of the groove and the axis of the stud.

27. A current collecting device comprising a support head and a tubular support member, a resilient rubber cushion interposed between the head and member, a stud mounted on the support head and having an enlarged upper end with a spherical under surface of extended area, a shoe retaining member having a spherical surface to engage with the said spherical under surface on the stud and prevent the removal of the shoe supporting member from the stud in one axial direction, while permitting movement relative thereto, an elongated grooved shoe mounted on the shoe retaining member and means to prevent removal of the shoe retaining member from the stud in the other axial direction, the shoe and its support rotatable about the axis of the stud and the shoe pivotal relative to the stud in a vertical plane common to the stud axis and the longitudinal center line of the groove and non-pivotal in a plane common to the stud axis and transverse to the groove.

28. A trolley device comprising a main member having a socket to receive a support member and a second socket to receive a stud member, the axis of the second socket being substantially vertical when the device is in use and angularly disposed to the axis of the first socket, a stud mounted in the second socket and secured against accidental removal, an enlargement mounted on the upper end of the stud and having a spherical convex surface, a retaining member having a spherical concave surface to contact with the convex surface and an elongated slot to receive the stud, the slot and stud cooperating to permit the retaining member to rotate relative to the stud about its longitudinal axis and pivot in the direction of the long diameter of the stud and a shoe having an elongated groove secured to the retaining member to move therewith.

29. A trolley device comprising a main member having a socket to receive a support member and a second socket to receive a stud member, the axis of the second socket being angularly disposed to the axis of the first socket, a stud mounted in the second socket and secured against accidental removal, an enlargement mounted on the upper end of the stud and having a spherical convex surface, a retaining member having a spherical concave surface to contact with the convex surface and an elongated slot to receive the stud, the slot and stud cooperating to permit the retaining member to rotate relative to the stud about its longitudinal axis and pivot in the direction of the long diameter of the stud, a shoe having an elongated groove secured to the retaining member to move therewith and a cover member to protect the retaining member and enlargement secured to and movable with the retaining member.

30. A shoe retaining device comprising a member having a recess with a spherical concave surface to engage a spherical convex surface on an enlargement on the end of a stud and move relative thereto, an elongated slot through the wall of the member and opening into the recess and arranged to cooperate with the stud to permit the device to rotate about the axis of the stud and pivot in the direction of the long diameter of the slot but not in the direction of the short diameter.

31. A sliding contactor comprising a part having a groove with an elongated contact surface to engage a conductor and a part with a convex spherical bearing surface to support the first part and upon which it may pivot.

In testimony whereof I affix my signature.
EDGAR D. MOORE.